(12) United States Patent
Sibilsky et al.

(10) Patent No.: US 8,958,018 B2
(45) Date of Patent: Feb. 17, 2015

(54) REMOTE CONTROL DEVICE AND METHOD FOR CONTROLLING OPERATION OF A MEDIA DISPLAY SYSTEM

(75) Inventors: Brian J. Sibilsky, Lake Zurich, IL (US); Ramy S. Ayoub, Arlington Heights, IL (US); Loren J. Rittle, Lake Zurich, IL (US); Wu-Hsi Li, Somerville, MA (US); Alvin D. Yates, Stanford, CA (US)

(73) Assignee: Google Technology Holdings LLC, Mountain View, CA (US)

( * ) Notice: Subject to any disclaimer, the term of this patent is extended or adjusted under 35 U.S.C. 154(b) by 48 days.

(21) Appl. No.: 12/976,009

(22) Filed: Dec. 22, 2010

(65) Prior Publication Data

US 2012/0162536 A1 Jun. 28, 2012

(51) Int. Cl.
*H04N 5/44* (2011.01)
*G09G 5/00* (2006.01)
*H04N 21/422* (2011.01)
*G06F 3/033* (2013.01)
*G06F 3/048* (2013.01)
*H04N 21/41* (2011.01)

(52) U.S. Cl.
CPC .......... *H04N 21/42207* (2013.01); *G06F 3/033* (2013.01); *G06F 3/048* (2013.01); *H04N 21/4126* (2013.01); *H04N 21/42209* (2013.01)
USPC ............................................ 348/734; 345/2.3

(58) Field of Classification Search
USPC ............ 348/734, 552, 553; 345/173, 2.1, 2.2, 345/2.3; 715/740
See application file for complete search history.

(56) References Cited

U.S. PATENT DOCUMENTS

| | | | |
|---|---|---|---|
| 6,130,726 A | 10/2000 | Darbee et al. | |
| 6,255,961 B1 | 7/2001 | Van Ryzin et al. | |
| 6,484,011 B1 | 11/2002 | Thompson et al. | |
| 6,784,805 B2 | 8/2004 | Harris et al. | |
| 6,970,127 B2 | 11/2005 | Rakib | |
| 7,109,974 B2 * | 9/2006 | Kempisty | 345/173 |

(Continued)

FOREIGN PATENT DOCUMENTS

| | | |
|---|---|---|
| WO | 00/59212 A2 | 10/2000 |
| WO | 03/044625 A2 | 5/2003 |

OTHER PUBLICATIONS

Universal Remote Control, Inc., "Universal Remote Control Unveils its MX-6000 Touch Screen Two-Way Remote", 3 page Article printed from Internet, BestStuff.com, Sep. 4, 2008.

Comcast Corporation, "Comcast Announces Launch for Xfinity TV App for iPad with the Ability to Watch TV Shows and Movies Anytime, Anywhere", 2 page Press Release published on Internet, Nov. 15, 2010.

(Continued)

*Primary Examiner* — Michael Lee
(74) *Attorney, Agent, or Firm* — Morris & Kamlay LLP (57) ABSTRACT

A remote control device for a separate electronic device to be controlled has a secondary display screen, at least one user-input mechanism, and at least one microprocessor running a user interface application for use in providing control over operation of the electronic device to be controlled. The user interface application causes a user interface to be displayed on the display screen of the remote control device, and the user interface displayed on the display screen graphically mirrors a corresponding user interface independently run by the electronic device to be controlled. The remote control device also has a transmitter and receiver mounted within the body enabling a two-way wireless communication link to be established with the electronic device to be controlled. Apparatus and a method for controlling operation of a media display system are also described.

19 Claims, 7 Drawing Sheets

(56) References Cited

U.S. PATENT DOCUMENTS

| | | |
|---|---|---|
| 7,174,508 B2 | 2/2007 | Lakhani et al. |
| 7,230,563 B2 | 6/2007 | Vidal |
| 7,263,712 B2 | 8/2007 | Spencer |
| 7,477,321 B2 * | 1/2009 | Yokoyama et al. ........... 348/553 |
| 2003/0140343 A1 | 7/2003 | Falvo et al. |
| 2004/0073944 A1 | 4/2004 | Booth |
| 2005/0240660 A1 * | 10/2005 | Sakao et al. .................. 709/219 |
| 2007/0236613 A1 | 10/2007 | Foss |
| 2008/0168514 A1 | 7/2008 | Jeon |
| 2008/0229361 A1 | 9/2008 | Jerding et al. |

OTHER PUBLICATIONS

Motorola Inc., "Motorola Introduces the EVr-8401 Enhanced TV Viewer; Hand-Held, Color, Touch-Screen Viewer Wirelessly Connects to a DCT5000 Family Digital Set-Top or Cable Modem to Enrich TV Viewing Experience", 3 page Press Release published on Internet, Nov. 28, 2001.

PCT Search Report & Written Opinion, RE: Application #PCT/US2011/065715; Mar. 21, 2012.

Canadian Office Action for CA 2828756 dated Jun. 11, 2014.

* cited by examiner

REMOTE CONTROL DEVICE AND METHOD FOR CONTROLLING OPERATION OF A MEDIA DISPLAY SYSTEM

FIELD

A device, apparatus and method enabling remote control of the operations of a separate electronic device are described, and more particularly, a portable, hand held remote control device is described that facilitates improved interaction and control of a set top box, television, or like electronic component of a media display system, such as a home entertainment system.

BACKGROUND

Program providers such as multiple system operators, television networks and stations, cable TV operators, satellite TV operators, studios, wireless service providers, and Internet broadcasters/service providers, among others, operate broadband communication systems, delivering programming and like content to consumers over networks via digital or analog signals. Consumer devices, such as set-top boxes, media centers, personal computers, televisions, and the like are adapted to receive and render delivered multimedia programming via an associated display monitor.

Consumer devices are typically provided with some form of portable, hand-held, battery-powered remote control device enabling convenient control of the consumer device by the end user. A typical remote control device uses short-range infra-red (IR) signals communicated one-way from the remote control to the set top box (STB) or like component of a home entertainment system. The use of two-way wireless communications between a consumer device and a remote control with RF signals has also been used particularly with respect to controlling operation of gaming consoles and the like.

New and additional features and services are continually being provided to consumers via network connections to set top boxes, televisions and like consumer devices. For example, services provided by a subscription television program provider may be expanded to include Internet browsing, viewing and searching of large video on-demand (VOD) catalogs, texting and other social applications, gaming, and the like. These expanded tasks as well as some traditional tasks and the control thereof may not be capable of being readily accomplished in a convenient manner by the end user via use of a conventional remote control device. This is because adequate control may require advanced cursor control, quick text input, relatively complicated on-screen selections, and like actions.

Accordingly, as the features of set top boxes and like consumer devices expand and become more complicated, control via user interface (UI) increasingly becomes more difficult and inconvenient to accomplish with conventional remote control devices. Thus, a remote control device and control system and method facilitating advanced and complex interaction and control of a consumer device in a manner convenient to the end user is needed.

SUMMARY

This disclosure describes a remote control device for a separate electronic device to be controlled. The remote control device has a housing providing a portable body on which a display screen is mounted and on which at least one user-input mechanism is provided. The remote control device has at least one microprocessor that is mounted within the body and that independently runs a user interface application for use in providing control over operation of the electronic device to be controlled. The user interface application causes a user interface to be displayed on the display screen of the remote control device. In appearance, the user interface displayed on the display screen graphically mirrors or is a true image of a corresponding user interface that is independently run by the electronic device to be controlled. Although the user interface of the remote control device and the user interface of the electronic device to be controlled mirror each other in appearance, these separate user interfaces can be separately utilized and run independent of each other. The remote control device has a transmitter and receiver mounted within the body enabling a two-way wireless communication channel link to be established with the electronic device to be controlled. The at least one microprocessor is responsive to user inputs received via actuation of the at least one user-input mechanism and controls the transmitter to transmit commands via the two-way communication link to the electronic device to be controlled. The at least one microprocessor causes commands to be sent to the electronic device to be controlled via the two-way wireless communication link only for user input corresponding to operational commands that cause a particular operational task to be actively performed by the electronic device to be controlled and not for user input of a passive nature not requiring the electronic device to be controlled to perform an operational task.

This disclosure further describes apparatus for controlling operation of a media display system. The apparatus includes an electronic device controlling a display of media and having a control module running a first user interface application controlling display of a user interface for use in controlling operation of the electronic device. The apparatus also includes a separate portable remote control device for controlling operation of the electronic device. The remote control device has a secondary display screen, at least one user-input mechanism, and at least one microprocessor running a second user interface application for displaying a user interface on the secondary display screen and communicates with the electronic device via a two-way short-range wireless communication link. The first and second user interface applications run entirely independent of each other, and in appearance, the user interface displayed on the secondary display screen graphically mirrors and/or is a true image of the user interface that can be caused to be displayed by the first user interface application. While these user interfaces mirror each other in appearance, they are entirely independent from one another. The at least one microprocessor of the remote control device being responsive to user inputs received via actuation of the at least one user-input mechanism and controls transmission of commands via the two-way communication link to the electronic device. In addition, the at least one microprocessor of the remote control device causing commands to be sent to the electronic device via the two-way wireless communication link only for user input corresponding to operational commands that cause a particular operational task to be actively performed by the electronic device to be controlled and not for user input of a passive nature not requiring the electronic device to perform an operational task.

Still further, this disclosure describes a method of controlling operation of a media display system. A primary electronic device controls the display of a user interface on a primary display screen. The user interface provides a means for controlling at least one of stored media selection and playback, streamed media selection and playback, and channel selection. Information displayed within the user interface is transmitted from the primary electronic device to a secondary device, and the information is displayed on a secondary display screen on the secondary device. User input relating to the information displayed on the secondary display screen is collected by the secondary device. This user input includes a first input type for causing a particular operational task to be performed by the primary electronic device and a second input type of a passive nature which does not require the primary electronic device to perform an operational task. A communication is transmitted from the secondary device to the primary electronic device as a result of the collected user inputs. The step of transmitting a communication from the secondary device to the primary electronic device occurs only when a user input of the first input type is collected, and the communication sent during this step is an operational command from the secondary device to the primary electronic device for causing a particular operational task to be actively performed by the primary electronic device.

BRIEF DESCRIPTION OF THE DRAWINGS

Various features of the embodiments described in the following detailed description can be more fully appreciated when considered with reference to the accompanying figures, wherein the same numbers refer to the same elements.

DETAILED DESCRIPTION

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments.

Figure 1:
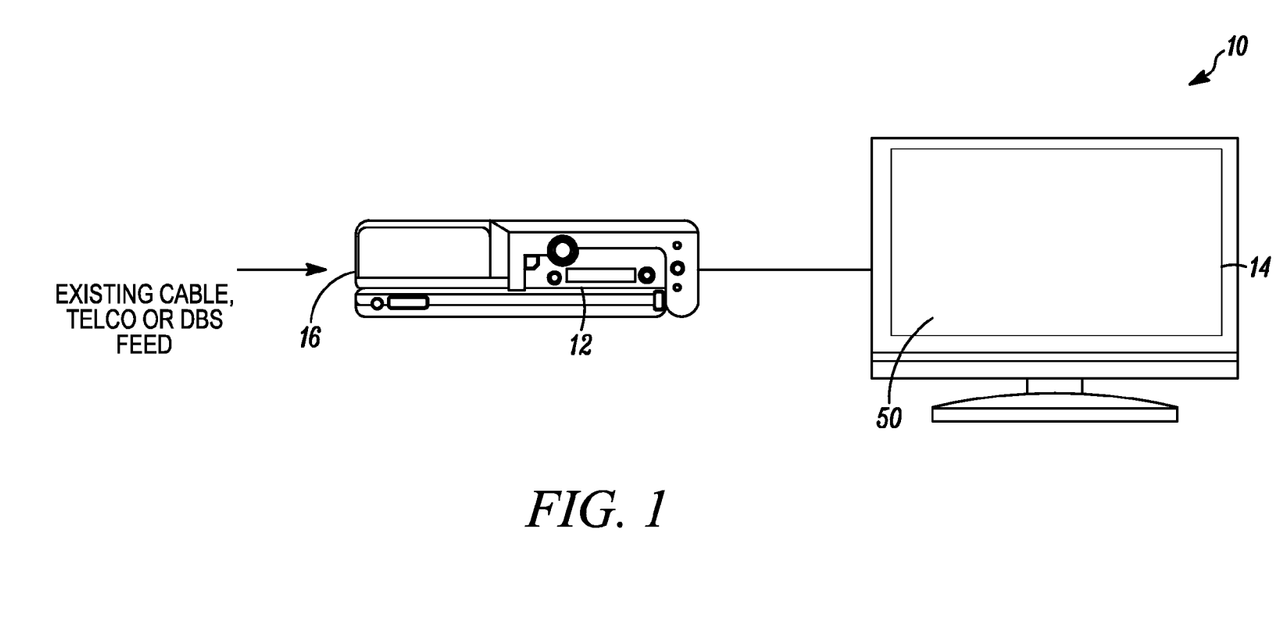
FIG. 1 is a schematic view of an arrangement of a consumer device interconnected to a display monitor.

A relatively simple arrangement 10 of a consumer electronic device 12, such as a set top box (STB), interconnected to a display monitor 14, such as a high definition flat screen television, is shown in FIG. 1. In the arrangement 10, the STB 12 has an input 16, such as an RF input, connected via a cable or the like to a service provider network such as a network of a cable or satellite subscription television program provider.

The arrangement 10 of FIG. 1 is provided merely for purposes of example and such an arrangement can include many different types and forms of consumer electronic devices. For example, the arrangement can include gaming consoles, consumer devices providing Internet connectivity, consumer devices providing connectivity to other networks such as local networks, personal video recorders and players or any other type of program recorder or player, personal computers, media centers, and the like. Also, many of the above referenced consumer devices can also be combined and embodied in a single, integral consumer device providing multiple different functions. For instance, the STB 12 in FIG. 1 may be manufactured integral with monitor 14.

Figure 2:
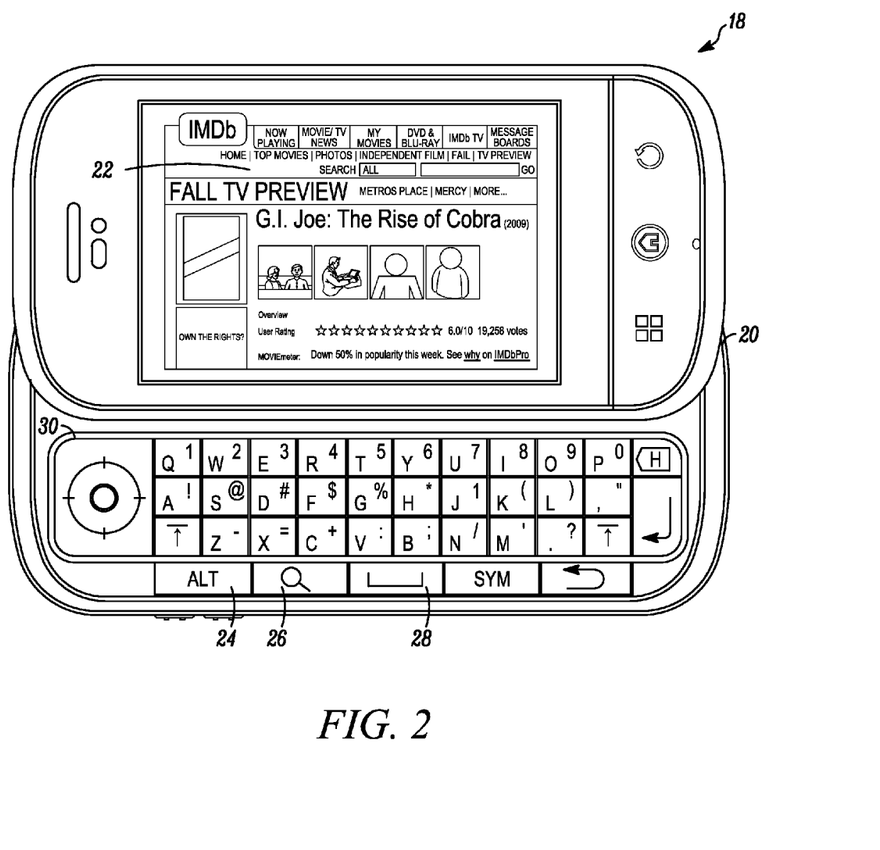
FIG. 2 is a plan view of a portable, hand held, remote control device for controlling operation of the consumer device in FIG. 1.

A portable, hand held remote control device 18 such as shown in FIG. 2 can be used by the end user for purposes of conveniently controlling operation of the STB 12 shown in FIG. 1. While the device 18 illustrated in FIG. 2 is shown as a remote control device dedicated for sole use with the STB 12, the functionality of device 18 could alternatively be embodied in another device that is not necessarily dedicated for use solely with the STB 12. For instance, the remote control device could be embodied as part of a mobile or smart-phone, hand held electronic organizer, net-book or laptop personal computer, or any other relatively portable device having an associated display screen.

The embodiment of the remote control device 18 shown in FIG. 2 has a housing 20 providing a portable body of a size that can be readily held in the hands of the end user. A display screen 22 is provided on the remote control device 18 along with one or more user input mechanisms 24 for use by the end user to navigate through possible selections and enter information, commands or the like via the remote control device 18. The input mechanisms 24 can be in the form of a key pad 26 having depressible buttons 28 corresponding to letters and/or numbers or other function keys (i.e., power on/off, back, enter, home, etc.). The mechanisms 24 can also include a cursor control mechanism 30 for controlling cursor or like movements, for instance, via arrow keys and an enter button, a touch control pad, a mouse controller or the like. As an alternative, some or all of the mechanisms 24 or any feature thereof can be embodied via a touch screen actuated simply by touching selected portions of the display screen 22 or an additional screen. Different types and forms of user input mechanisms 24 are capable of being embodied on the remote control device 18 to provide the end user with an ergonomic, user-friendly control device.

Figure 3:
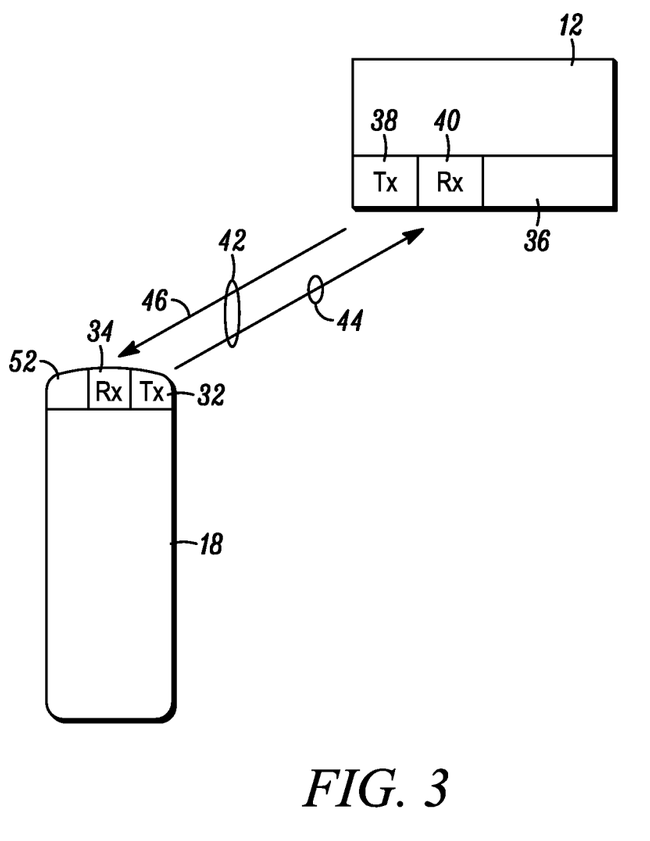
FIG. 3 is a schematic view showing the two-way communication link between the consumer device and the remote control device.

As best shown in FIG. 3, the remote control device 18 interfaces and communicates with the STB 12 or other consumer device of the arrangement 10. For this purpose, the remote control device 18 includes a transmitter 32 and a receiver 34 within the housing 20 for use in transmitting and receiving communication signals to and from the STB 12, and in turn, the STB 12 has a control module 36 with a transmitter 38 and receiver 40 for communicating with the remote control device 18.

For reasons to be explained, the communication link 42 between the remote control device 18 and the control module 36 of the STB 12 is a two-way communication link 42 including a forward link 44 for communications from the remote control device 18 to the STB 12 and a return link 46 for communications from the STB 12 to the remote control device 18. Thus, the remote control device 18 can transmit commands or requests for data or information to the STB 12 and the STB 12 can transmit data or information to the remote control device 18. By way of example, the two-way communication link 42 can be accomplished with a short-range wireless two-way communication channel link such as provided by Bluetooth wireless technology, Wi-Fi, IP link, home network, WAN, RF, IR or any like or available communication technology.

Operation of the STB 12 can be controlled via two separate and independent user interface applications. One of these applications can be run by the STB 12 itself with user interface selection screens displayed on the monitor 14. This, of course, is conventional. A second user interface application is run on the remote control device 18 with user interface screens displayed on the display screen 22 of the remote control device 18. These separate user interface applications and selection screens graphically mirror each other (i.e. provide true images of each other) in appearance, but are otherwise independent of each other. Thus, the user interface or graphical user interface experience provided to the end user is essentially the same regardless of which user interface application is actually used. The end user may not perceive that these user interfaces are in fact separate of one another. However, when the user interface interaction is accomplished on the display screen 22 of the remote control device 18, the media, content or programming being displayed on the monitor 14 can continue uninterrupted without disturbing current viewers of the media, content or programming. For this reason, a particular end user may find it advantageous to utilize the user interface on the display screen 22 of the remote control device 18 because this permits the user interface of the STB 12 to remain idle and the media, content or programming displayed on the monitor 14 to continue uninterrupted by a user interface application.

Figure 5:
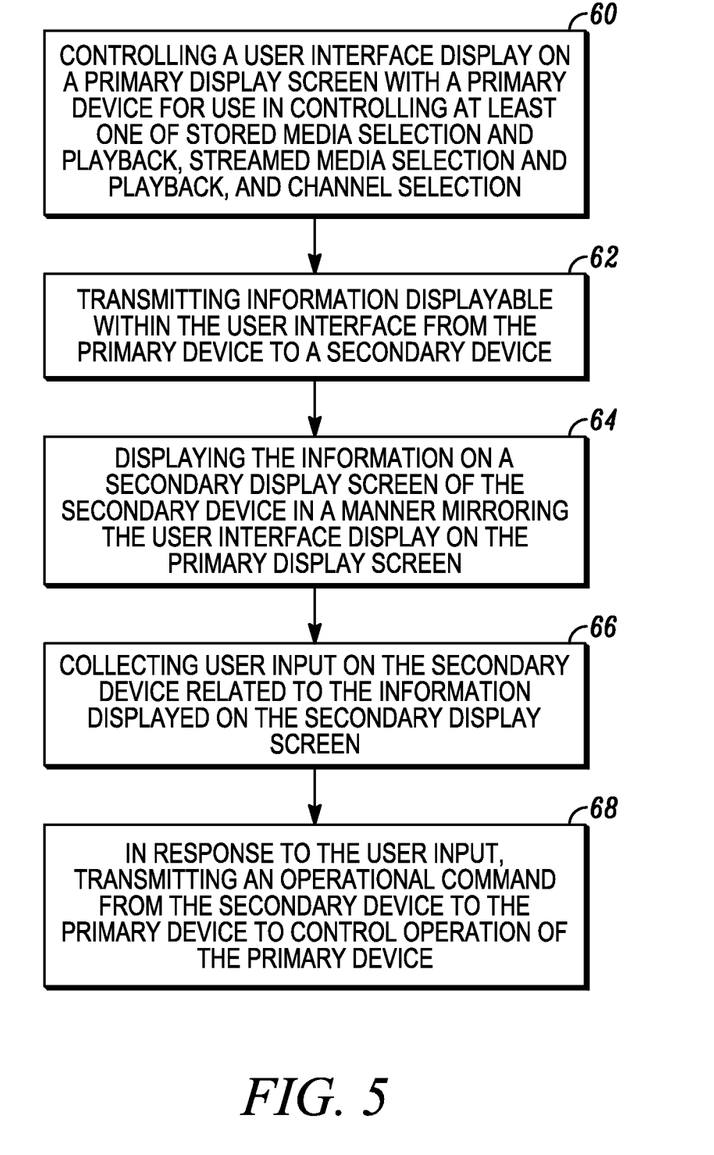
FIG. 5 is a block diagram of process steps for a method of controlling operation of an electronic consumer device with a remote control device.

Accordingly, as with conventional consumer devices, the control module 36 of the consumer device 12 can run a user interface (UI) application, such as a graphical user interface (GUI) application, and can have UI or GUI selection screens 48 displayed directly on the display monitor 14. See step 60 in FIG. 5. For purposes of this disclosure, a display screen 50 of the monitor 14 is considered the "primary" display screen of the arrangement 10. The display screen 50 is referenced as "primary" since the end user primarily uses the display screen 50 for purposes of viewing programming and content and uses the display screen 50 for control purposes only out of necessity.

The underlying data, information or assets from which selections can be made via use of the UI or GUI selection screens is provided to the STB 12 through its connection to the provider network via input 16. By interacting with the UI or GUI selection screens 48, a user can view program schedule listings, select a channel for viewing, schedule or manage recording or playback from personal video recorders (PVRs), browse and search video on-demand (VOD) catalogs, and perform various other tasks possible with the particular consumer device 12 being controlled.

When a UI or GUI selection screen 48 is displayed on the primary display screen 50, the end user can interact, navigate, make selections, etc. via manipulation of buttons directly on the STB 12 or, according to some embodiments, via manipulation of the keyboard, function keys, etc. of the remote control device 18. In this mode of operation, the remote control device 18 can function as a conventional remote control device and use the UI or GUI application run by the STB 12 to control operations of the STB 12.

However, for purposes of providing an alternate means of controlling operation of the STB 12, the remote control device 18 includes at least one microprocessor 52 or like controller within the housing 20 that can run a UI or GUI application independent of the UI or GUI application run by the STB 12. In this case, UI or GUI selection screens 54 are displayed on the display screen 22 of the remote control device 18 and are not required to be displayed on the primary display screen 50. See step 64 of FIG. 5. The selection screens 54 appearing on the display screen 22 of the remote control device 18 graphically and visually appear the same as those that would appear on the primary display screen 50 if the user interface application of the STB 12 was used. For purposes of this disclosure, the display screen 22 of the remote control device 18 is considered the "secondary" display screen of the arrangement 10.

The data, information, or assets (hereinafter collectively referred to as "information") appearing in user interface selection screens 54 are passively transmitted, refreshed, and/or provided to the remote control device 18 from the STB 12 via the two-way communication link 42. See step 62 in FIG. 5. The "information" can be a static image, a dynamic image, a set of codes required to reproduce a static image along with known interaction points, and/or a set of codes required to reproduce a dynamic image along with known interaction points.

When an end user interacts with the UI or GUI application of the remote control device 18, operation of the STB 12 is essentially unaffected and the STB merely passively forwards and/or refreshes any underlying information via the two-way communication link 42 to the remote control device 18. Thus, as the end user searches through or browses program schedule or channel listings, schedules or manages recordings from personal video recorders (PVRs), browses and searches through video on-demand (VOD) catalogs, and the like, the STB 12 is not required to take any action and operates without respect to the user's interaction with the remote control device 18.

During user interaction, the remote control device 18 collects user inputs relating to the information disclosed on the secondary display screen 22. See step 66 in FIG. 5. Some of these inputs are for requesting the STB 12 to actively perform a particular task (i.e., change the channel, play a stored recording, etc.) and some of the inputs require the STB 12 to remain passive and perform no function (i.e., keystrokes with respect to browsing a listing or catalog on the remote control device, keystrokes with respect to mere cursor movement on the remote control device, etc.). When the end user provides the type of input that is for requesting the STB 12 to actively perform a particular task, a specific "final" operational command or instruction is generated by the remote control device 18 and is communicated to the STB 12 via the two-way communication link 42 to cause the STB 12 to perform/execute the action. See step 68 in FIG. 5. However, if the input received by the remote control device is not of a type requiring a task to be performed by the STB 12, no communication is sent from the remote control device 18 to the STB 12 as a result of the input. Thus, mere browsing of a catalog or listing or movement of a cursor on the display screen 22 of the remote control device 18 will not generate a transmission from the remote control device 18 to the STB 12. During this mode of operation, efficient use of bandwidth of the two-way communication link is realized because only final operational commands are transmitted to the STB 12 from the remote control device 18 and not all other user interaction such as keystrokes or cursor movements with respect to searching and browsing.

By way of example, an end user could use the user interface provided on the display screen 22 of the remote control device 18 to search and/or browse a program schedule guide or listing for a particular time of the day. This interaction does not require a command or transmission to be sent to the STB 12 and minimizes the amount of data that needs to be passed between the STB 12 and remote control device 18. However, if a specific channel is selected, then the remote control device 18 generates an appropriate operational command to cause the STB 12 to change the channel. Another example of a "final" operational command is to play a particular video from stored media or streamed media.

Figure 4:
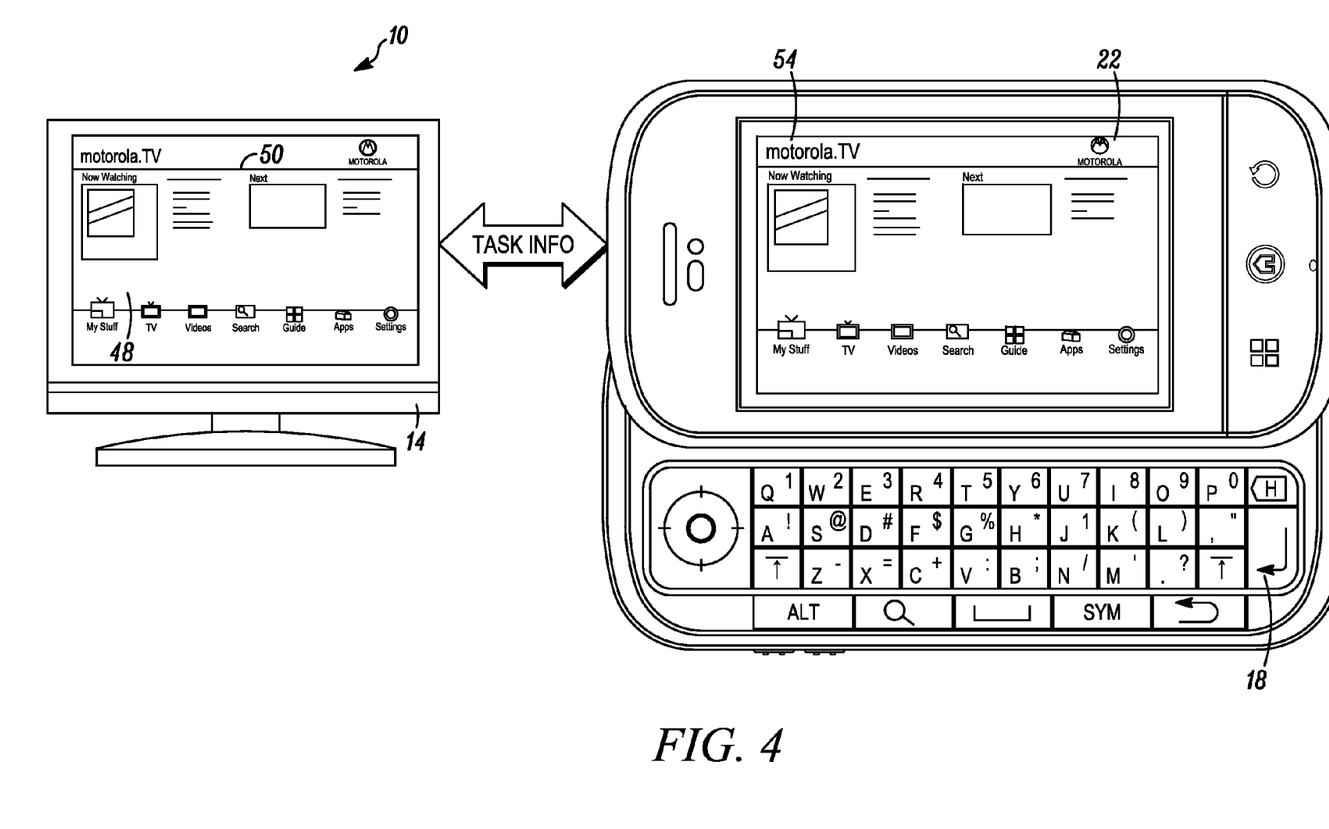
FIG. 4 is a view of a user interface (UI) for the consumer device as displayed on the display monitor and as displayed and mirrored as a true image on a display screen of the remote control device.

As best illustrated in FIG. 4, although separate user interface applications are run independently by the STB 12 and remote control device 18, the user interface screens are essentially identical from a graphical/visual standpoint (i.e., they mirror each other providing true images of each other). Thus, regardless of which user interface application is used (the one run on the STB 12 or the one run on the remote control device 18), the selections, screens, data, information, assets, etc. are presented in the same fashion to the end user, the only difference being whether the UI or GUI selection screens are displayed on the primary display screen 50 or the secondary display screen 22. In this manner, the end user only needs to learn to operate one UI or GUI application to control operation of the consumer device 12 since the UI or GUI applications running on the STB 12 and remote control device 18 are essentially the same to the end user.

Further, using the UI or GUI selection screens 54 on the secondary display screen 22 enables the viewing experience of a program or other media or content on the primary display screen 50 to remain uninterrupted. Thus, listings, settings and the like can be viewed on the secondary display screen 22 without disturbing the program currently being viewed (i.e., a movie, sporting event, show, etc.) via the primary display screen 50. The STB 12 and primary display screen 50 are only affected by user manipulation of the UI or GUI selection screens 54 on the secondary display screen 22 when a particular "final" task or operational command is selected (i.e., change channel, play video, etc.) and not during searching or browsing user interaction or other interaction not requiring the STB 12 to actively perform a task.

With respect to communications transmitted from the remote control device 18 to the STB 12 via the two-way communication link 42, such transmissions may not be able to be communicated immediately upon the press of a button as with conventional remote control devices and may be required to be first queued for a short period of time within the remote control device 18 before being transmitted to the STB 12. Examples of such procedures are illustrated in the flowcharts of FIGS. 6 and 7.

While a conventional remote control device communicating with a STB over a dedicated IR or RF link may be able to immediately send all user input events to the STB, the transmissions of IP packets over a home network or WAN (i.e. the two-way communication link 42) from the remote control device 18 to the STB 12 may require timing of transmissions according to the specific needs of the STB 12 or primary display monitor 14. For example, the step of transmitting an operational command from the remote control device 18 to the primary electronic device 12 to control operation of the primary electronic device 12 may be timed to match the nominal input processing rate (NIPR) of the primary electronic device 12 (see FIG. 6) or the nominal screen refresh rate (NSRR) of the primary display screen 14 (see FIG. 7). The operational command may correspond to one or more user inputs entered by the user via the remote control device 18. Simply by way of example, a "final" operational command may not be caused to be generated until the twentieth input received by the remote control device 18 due to intermediate inputs with respect to searching or other passive inputs.

Nominal input processing rate (NIPR) is a measure of the processing power of the target device (in this case the CPU speed of the primary device 12). The secondary device (i.e. remote control device 18) may or may not have more processing power than the primary device 12. For example, if the remote control device 18 is embodied within a smart-phone or the like, the smart phone may have greater processing power than the STB 12. Nominal screen refresh rate (NSRR) is a measure of how often the screen is updated (which may or may not be equal to the rate at which display frames are sent to the primary display 14; e.g. in HDMI/1080P, frames may be sent at a 60 Hz, 30 Hz or 24 Hz rate).

Figure 6:
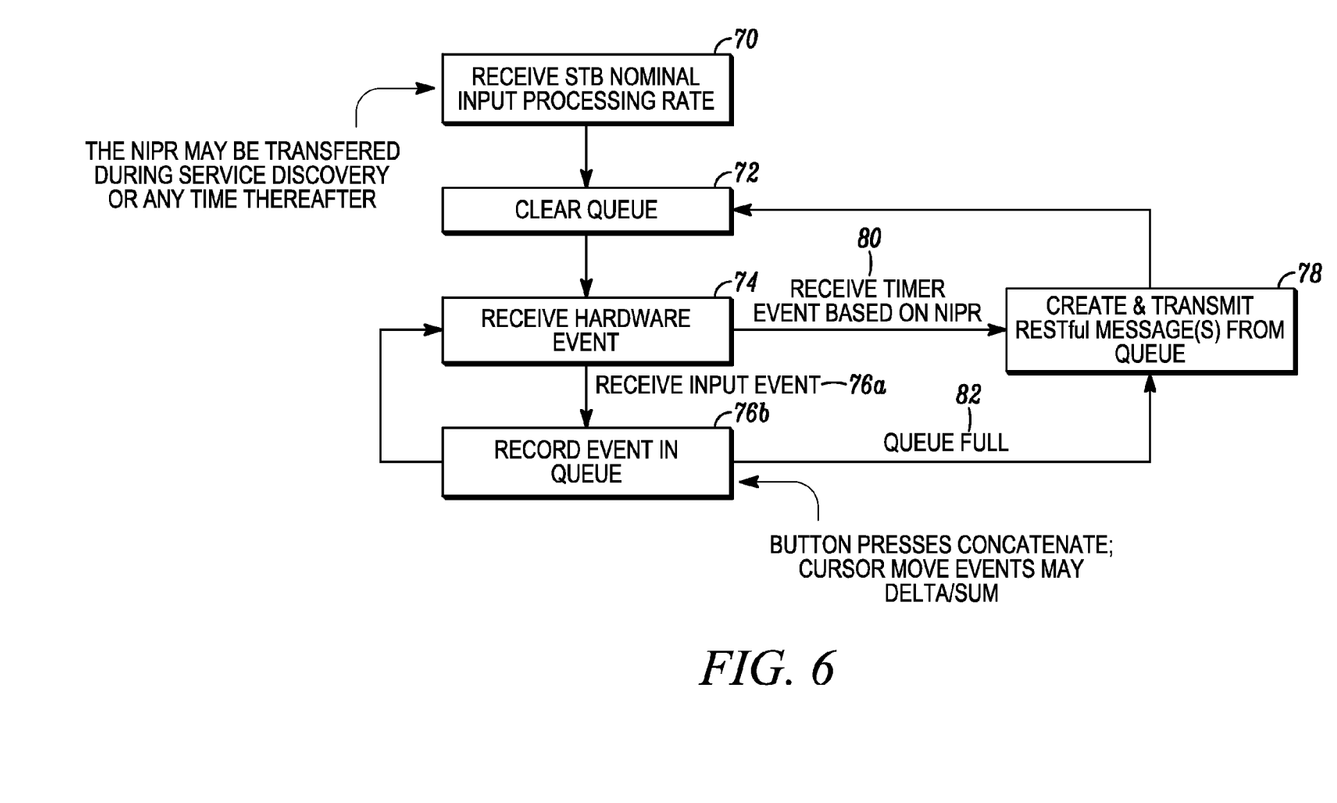
FIG. 6 is a block diagram of process steps of a first embodiment of collecting user input with a remote control device and sending a transmission over an IP link from the remote control device to the consumer device.
Figure 7:
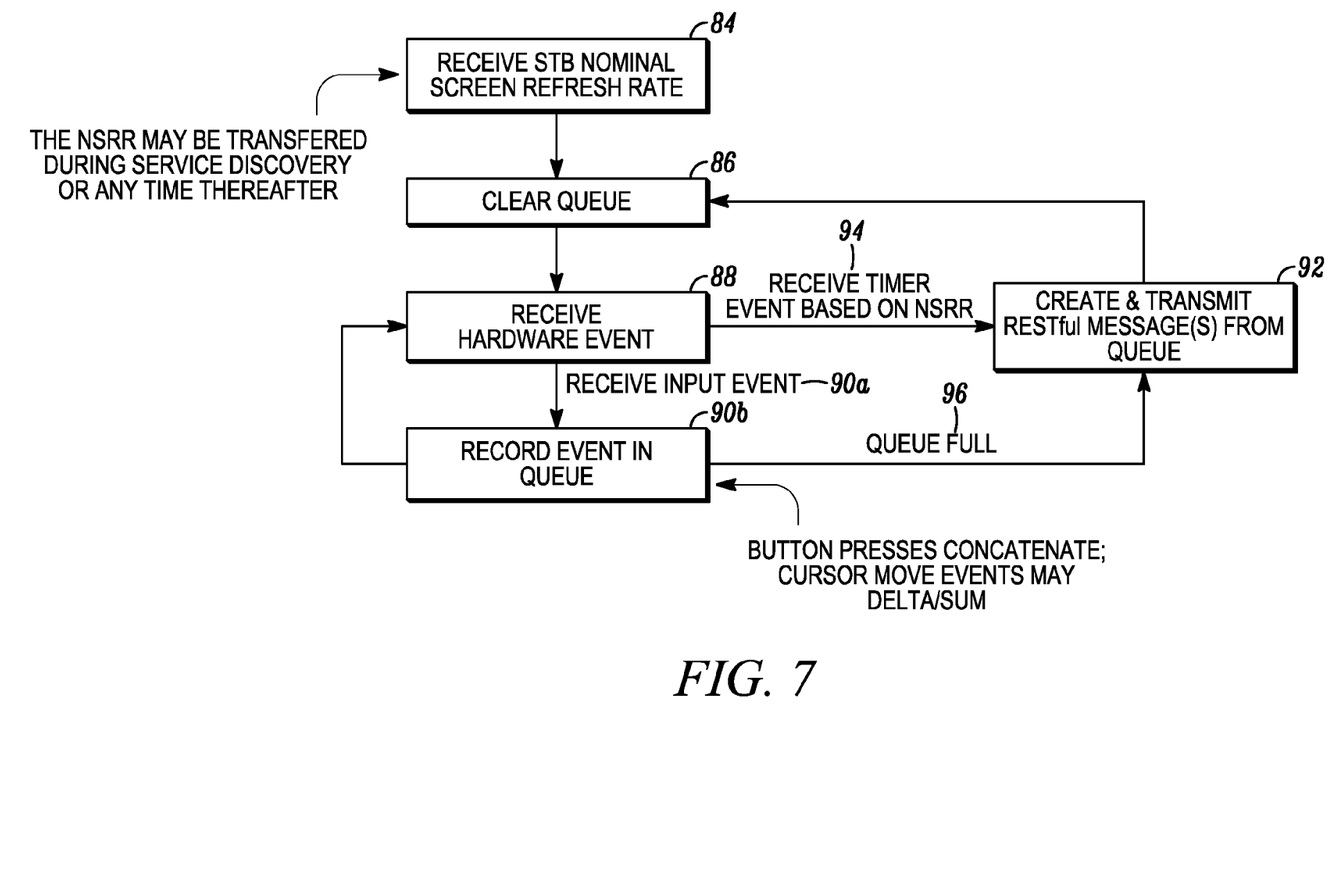
FIG. 7 is a block diagram of process steps of a second embodiment of collecting user input with a remote control device and sending a transmission over an IP link from the remote control device to the consumer device.

The flowcharts of FIGS. 6 and 7 illustrate the process of collecting user inputs with the remote control device 18, recording these events in a queue within the remote control device 18, and transmitting commands or the like to the primary device 12 at timed intervals. In the embodiment shown by FIG. 6, the transmit rate of the remote control device 18 over the IP link 42 is bound to the NIPR of the STB 12, and in the embodiment shown by FIG. 7, the transmit rate of the remote control device 18 over the IP link 42 is bound to the NSRR of the primary display monitor 14.

By way of example, the remote control device 18 can receive information concerning the NIPR of the STB 12 during a service discovery period or any time thereafter in a field of a normal feedback message from the STB 12 to the remote control device 18. See step 70 in FIG. 6. The queue of user inputs in the remote control device is initially cleared as shown in step 72. "Hardware events" such as a physical touch of a touch screen by the user, a physical push of a depressible button by the user, or other hardware sensor inputs are detected and received by the remote control device 18 based on the user's interaction with the device 18. (See step 74 in FIG. 6.) In addition, "input events" such as GUI selections that are known to the GUI application (as opposed to hardware sensors) may also be received by the remote control device 18 based on the user's interaction with the device 18. (See step 76 in FIG. 6.) The user inputs (i.e., hardware events and input events) are recorded in the queue of the remote control device 18 as shown in step 76b. User input selections or "button presses" of the remote control device 18 may concatenate in the queue and cursor movement events may delta/sum. Depending upon mode of operation of the remote control device, a "restful" message or IP packet can be created and sent from the remote control device 18 to the STB 12 via the two-way communication link 42 (see step 78 in FIG. 6) at the next timed interval defined by the NIPR (see step 80 in FIG. 6) or when the queue becomes full (see step 82 in FIG. 6) thereby minimizing IP packets sent from the remote control device 18 to the STB 12. After the message is sent, the queue is cleared. See step 72.

In a similar manner with respect to FIG. 7, the remote control device 18 can receive information concerning the NSRR of the display monitor 14 via the STB 12 during a service discovery period or any time thereafter in a field of a normal feedback message from the STB 12 to the remote control device 18. See step 84 in FIG. 7. The queue of user inputs in the remote control device is initially cleared as shown in step 86. "Hardware events" such as a physical touch of a touch screen by the user, a physical push of a depressible button by the user, or other hardware sensor inputs are detected and received by the remote control device 18 based on the user's interaction with the device 18. (See step 88 in FIG. 7.) In addition, "input events" such as GUI screen selections that are known to the GUI application (as opposed to hardware sensors) may also be received by the remote control device 18 based on the user's interaction with the device 18.

(See step 90*a* in FIG. 7.) The user inputs (i.e., hardware events and input events) are recorded in the queue of the remote control device 18 as shown in step 90*b*. User input selections or "button presses" of the remote control device 18 may concatenate in the queue and cursor movement events may delta/sum. A message or IP packet can be sent from the remote control device 18 to the STB 12 via the two-way communication link 42 (see step 92 in FIG. 7) at the next timed interval based on the NSRR (see step 94 in FIG. 7) or when the queue becomes full (see step 96 in FIG. 7) thereby minimizing IP packets sent from the remote control device 18 to the STB 12. After the message is sent, the queue is again cleared. See step 86.

By way of further example, if the remote control device 18 is used to control mouse/cursor movements on the primary display monitor 14, the number of cursor updates sent over the IP link 42 is limited to a selected rate, such as provided by NIPR or NSRR. Thus, when the selected transmission rate allows for another transmission from the secondary device 18 to the primary device 12, any collected events are batched together and transmitted. Cursor movements are batched by direct summation bounded by non-cursor events. Other events are batched by in-order and/or time-stamped concatenation. As other possible alternatives for determining transmission rates, the feedback of the current state of the primary device 12 can be used to set the future transmission rate for the remote control device 18, or the transmission rate of the remote control device 18 can be arbitrarily set at the time of system configuration.

In addition, since the remote control device 18 has the ability to queue user input commands, the remote control device 18 is also operative in an "offline" mode of operation. For example, if the remote control device 18 loses connectivity to the STB 12 for any reason (i.e., user walks away from the STB 12, is out of WiFi range, the power is "off" on the STB 12, etc.), the remote control device 18 has the ability to store user interface events and allow the user to navigate the UI on the remote control device 18 while the remote control device 18 is out of range or no longer in communication with the STB 12. The user may, for example, select a program for recording while out of range, and when the remote control device 18 returns into range, the remote control device 18 can then forward the saved commands in the queue to the STB 12 to take the actions selected by the user while out of range. Thus, the remote control device 18 will not only store the user commands, but will also store the UI screens for the user to execute the commands while out of range. Thus, unlike conventional remote controls where access activities require real-time connectivity back to the primary device, the remote control device 18 can store commands for later execution when the remote control device 18 is in communication with the STB 12.

The secondary display screen 22 of the remote control device 18 may also be used for other purposes than those discussed above. For example, relevant, related or supplemental information can be displayed on the display screen 22 to the end user while a program is being simultaneously played on the primary display screen 50. The supplemental information is information not being displayed on the primary display screen 50 but is otherwise relevant or related to the program being displayed on the primary display screen 50. For example, if a sporting event is being displayed on the primary display screen 50, information relevant to the sporting event can automatically be transmitted to the remote control device 18 via the two-way communication link 42 from the STB 12 and displayed on the second display screen 22. The relevant information can be statistical information concerning the sporting event or scores or updates concerning related games or the like. Alternatively, if the program on the primary display screen 50 is a movie, information concerning the movie such as cast members, reviews, summaries, etc. can be displayed on the secondary display screen 22. Accordingly, the display screen 22 on the remote control device 18 can be used for purposes of controlling operation of the STB 12 and for displaying related supplemental information to the end user with respect to the program being simultaneously viewed on the primary display screen 50.

In some contemplated embodiments, the remote control device 18 can include a login procedure enabling personalization information to be communicated from the remote control device 18 to the STB 12. Such information can include favorite lists, personal interest, etc. that can enhance operation of the remote control device 18 and STB 12 for a particular user.

While the principles of the invention have been described above in connection with specific devices, apparatus, systems, and methods, it is to be clearly understood that this description is made only by way of example and not as limitation on the scope of the invention as defined in the appended claims.

We claim:

1. A remote control device for a separate electronic device to be controlled, comprising:
   a housing providing a portable body on which a display screen is mounted and on which at least one user-input mechanism is provided;
   at least one microprocessor mounted within said body running a graphical user interface application providing control over operation of the electronic device to be controlled and for displaying a graphical user interface on said display screen, in appearance, said graphical user interface displayed on said display screen graphically mirrors a corresponding graphical user interface independently run by the electronic device to be controlled, wherein information received from the electronic device and used to produce said graphical user interface on said display screen, includes a graphical image and at least one of (i) a set of codes to reproduce the graphical image, and (ii) an interaction point associated with the graphical image; and
   a transmitter and receiver mounted within said body providing a two-way wireless communication link with the electronic device to be controlled;
   said at least one microprocessor being responsive to user inputs received via actuation of said at least one user-input mechanism and controlling said transmitter to transmit commands via said two-way communication link to the electronic device to be controlled;
   said at least one microprocessor causing commands to be sent to the electronic device to be controlled via the two-way wireless communication link only for user input corresponding to operational commands that cause a particular operational task to be actively performed by the electronic device to be controlled and not for user input of a passive nature not requiring the electronic device to be controlled to perform an operational task; and
   said at least one microprocessor causing the commands to be queued within the remote control device and timing a transmission of the commands to match a nominal input processing rate (NIPR) of the electronic device.

2. A remote control device according to claim 1, wherein said graphical user interface displayed on said display screen is for providing control over at least one of stored media selection and playback, streamed media selection and playback, and channel selection by the electronic device to be controlled, and wherein the information displayed within said graphical user interface on said display screen is obtained by said at least one microprocessor from communications received by said receiver via said two-way communication link from the electronic device to be controlled.

3. A remote control device according to claim 1, wherein said at least one user-input mechanism includes at least one of a keypad, a cursor control mechanism, and a touch screen mechanism.

4. Apparatus for controlling operation of a media display system, comprising:
an electronic device controlling a display of media and having a control module running a first graphical user interface application controlling display of a graphical user interface for use in controlling operation of said electronic device; and
a separate portable remote control device for controlling operation of said electronic device, said remote control device having a secondary display screen, at least one user-input mechanism, and at least one microprocessor running a second graphical user interface application for displaying a graphical user interface on said secondary display screen, wherein information received from the electronic device and used to produce said graphical user interface on said display screen, includes a graphical image and at least one of (i) a set of codes to reproduce the graphical image, and (ii) an interaction point associated with the graphical image said remote control device communicating with said electronic device via a two-way short-range wireless communication link;
said first and second graphical user interface applications running independently of each other and, in appearance, said graphical user interface displayed on said secondary display screen graphically mirroring said graphical user interface displayed by said first graphical user interface application;
said at least one microprocessor of said remote control device being responsive to user inputs received via actuation of said at least one user-input mechanism and controlling transmission of commands via said two-way communication link to the electronic device;
said at least one microprocessor of said remote control device causing commands to be sent to the electronic device via the two-way wireless communication link only for user input corresponding to operational commands that cause a particular operational task to be actively performed by the electronic device to be controlled and not for user input of a passive nature not requiring the electronic device to perform an operational task, and
said at least one microprocessor queueing the commands within the remote control device and timing a transmission of the queued commands to match a nominal input processing rate (NIPR) of the electronic device.

5. Apparatus according to claim 4, wherein said electronic device is a set-top box that controls the display of media and said graphical user interface of said first graphical user interface application on a primary display screen.

6. Apparatus according to claim 4, wherein information displayed within said graphical user interface of said second graphical user interface application on said secondary display screen is obtained by said at least one microprocessor from communications received via said two-way communication link from said electronic device.

7. Apparatus according to claim 4, wherein said graphical user interface displayed on said secondary display screen by said second graphical user interface application does not interrupt said display of media controlled by said electronic device.

8. A method of controlling operation of a media display system, comprising the steps of:
controlling with a primary electronic device a display of a graphical user interface on a primary display screen, the graphical user interface providing a mechanism for control of at least one of store media selection and playback, streamed media selection and playback, and channel selection;
transmitting information displayed within the graphical user interface from the primary electronic device to a secondary device, wherein the information includes a graphical image and at least one of (i) a set of codes to reproduce the graphical image, and (ii) an interaction point associated with the graphical image;
displaying the information on a secondary display screen of the secondary device, the information transmitted to the secondary device being displayed on the secondary display screen as an exact image of the information displayed in the graphical user interface on the primary display screen;
collecting user input on the secondary device relating to the information displayed on the secondary display screen, the user input including a first input type for causing a particular operational task to be performed by the primary electronic device and a second input type of a passive nature which does not require the primary electronic device to perform an operational task; and
transmitting a communication from the secondary device to the primary electronic device as a result of user inputs collected during said collecting step;
said step of transmitting a communication from the secondary device to the primary electronic device occurring only when a user input of the first input type is collected during said collecting step and not as a result of collecting user input of only the second input type;
the communication sent during said step of transmitting a communication from the secondary device to the primary electronic device being an operational command from the secondary device to the primary electronic device for causing a particular operational task to be actively performed by the primary electronic device and
queueing operational commands within the remote control device and timing a transmission of the queued operational commands to match a nominal input processing rate (NIPR) of the primary electronic device.

9. The method according to claim 8, wherein the first user input type of user input corresponds to at least one of a channel selection, stored media selection and playback, and streamed media selection and playback.

10. The method according to claim 8, wherein the second input type of user input corresponding to at least one of cursor movement, searching user interaction, and browsing user interaction.

11. The method according to claim 8, wherein the graphical image is selected from a group consisting of a static image and a dynamic image.

12. The method according to claim 8, wherein said secondary display is a touch-screen display, and wherein said collecting step is accomplished via the touch-screen display.

13. The method according to claim 8, wherein the primary electronic device is a set-top box.

14. The method according to claim 8, wherein the secondary device is selected from a group consisting of a dedicated hand-held remote control device, a hand-held smart-phone device, an electronic personal organizer, and a personal computer.

15. The method according to claim 8, further comprising the step of displaying media on the primary display screen under control of the primary electronic device that is uninterrupted during said steps of transmitting information to the secondary device, displaying the information on the secondary display screen, and collecting user input on the secondary device whereby the display of media on the primary display screen remains uninterrupted until an operational command is transmitted.

16. The method according to claim 8, further comprising the step of independently running separate graphical user interface applications on said primary electronic device and said secondary device whereby user interaction with either of said separate graphical user interface applications provides a mechanism of control over operation of the primary electronic device.

17. The method according to claim 8, further comprising the steps of transmitting supplemental information to the secondary device relating to media being displayed on the primary display screen and displaying the supplemental information on the secondary display screen simultaneous with display of the media on the primary display screen.

18. The method according to claim 8, wherein said step of transmitting an operational command from the secondary device to the primary electronic device to control operation of the primary electronic device is timed to match one of the primary electronic device's nominal input processing rate and the primary electronic device's nominal screen refresh rate.

19. The method according to claim 8, the operational command is in response to multiple user inputs including a user input of the first input type.

* * * * *